United States Patent
Kiyomoto et al.

(10) Patent No.: US 8,361,214 B2
(45) Date of Patent: Jan. 29, 2013

(54) INKJET AQUEOUS INK

(75) Inventors: Hiroshi Kiyomoto, Kanagawa-ken (JP); Ryozo Akiyama, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 350 days.

(21) Appl. No.: 12/854,939

(22) Filed: Aug. 12, 2010

(65) Prior Publication Data

US 2011/0048278 A1    Mar. 3, 2011

Related U.S. Application Data

(60) Provisional application No. 61/237,826, filed on Aug. 28, 2009.

(51) Int. Cl.
*C09D 11/02* (2006.01)

(52) U.S. Cl. .................. 106/31.86; 106/31.89

(58) Field of Classification Search ............ 106/31.86, 106/31.89
See application file for complete search history.

(56) References Cited

U.S. PATENT DOCUMENTS

| | | | |
|---|---|---|---|
| 5,098,476 A * | 3/1992 | Baker | 106/31.46 |
| 5,650,543 A * | 7/1997 | Medina | 568/616 |
| 6,221,141 B1 | 4/2001 | Takada et al. | |
| 6,827,433 B2 | 12/2004 | Takemoto et al. | |
| 7,348,300 B2 * | 3/2008 | Lassila et al. | 510/175 |
| 7,384,991 B2 | 6/2008 | Komatsu et al. | |
| 7,708,821 B2 * | 5/2010 | Kiyomoto et al. | 106/31.86 |
| 7,758,684 B2 * | 7/2010 | Mizusaki et al. | 106/31.89 |
| 8,133,313 B2 * | 3/2012 | Akiyama et al. | 106/31.86 |
| 8,226,756 B2 * | 7/2012 | Akiyama et al. | 106/31.86 |
| 2003/0078307 A1 * | 4/2003 | Shinohara et al. | 516/113 |
| 2003/0195274 A1 | 10/2003 | Nakamura et al. | |
| 2005/0176605 A1 * | 8/2005 | Lassila et al. | 510/175 |
| 2007/0283845 A1 * | 12/2007 | Mizusaki et al. | 106/31.86 |
| 2008/0282932 A1 | 11/2008 | Kiyomoto et al. | |
| 2011/0012954 A1 * | 1/2011 | Brown et al. | 347/20 |
| 2011/0273508 A1 * | 11/2011 | Kiyomoto et al. | 106/31.85 |

FOREIGN PATENT DOCUMENTS

EP    1041127 A1    10/2000

OTHER PUBLICATIONS

European Search Report dated Nov. 3, 2010 for European Patent Application No. 10172711.3-2102.

* cited by examiner

*Primary Examiner* — Helene Klemanski
(74) *Attorney, Agent, or Firm* — Turocy & Watson, LLP

(57) ABSTRACT

According to one embodiment, an inkjet aqueous ink includes water, a pigment, a water-soluble organic solvent, a poorly water-soluble compound, a solubilizer that solubilizes the poorly water-soluble compound in water, and an acetylene glycol-based surfactant. The poorly water-soluble compound is 2,5,8,11-tetramethyl-6-dodecyne-5,8-diol. The solubilizer is selected from polyoxyethylene anionic surfactants and non-ionic surfactants.

20 Claims, 1 Drawing Sheet

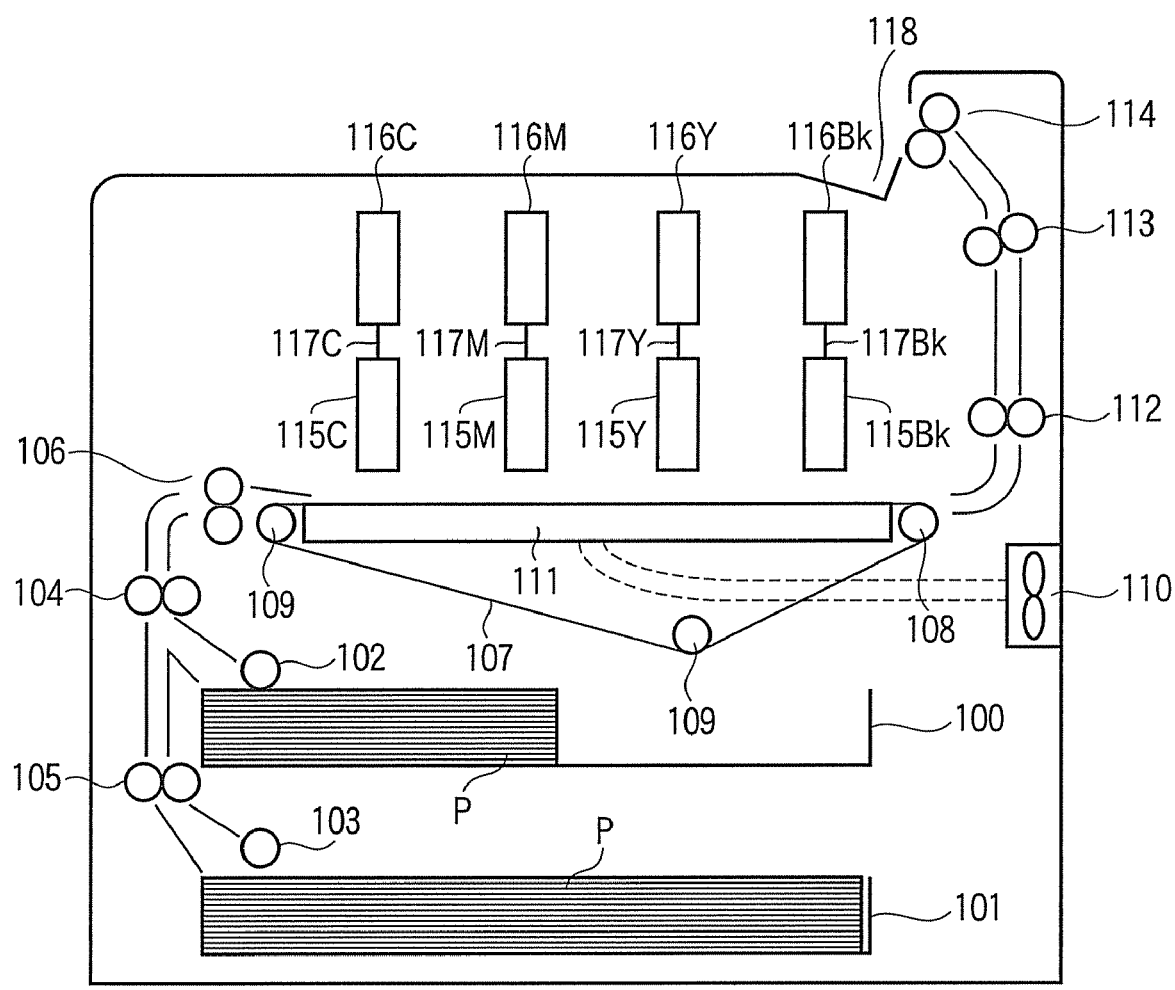

INKJET AQUEOUS INK

CROSS-REFERENCE TO RELATED APPLICATION

This application is based upon and claims the benefit of priority from U.S. Provisional Application No. 61/237,826 filed on Aug. 28, 2009, the entire contents of which are incorporated herein by reference.

FIELD

Embodiments described herein relate generally to inkjet ink.

BACKGROUND

Ink produced by dispersing a pigment in an aqueous medium is proposed. Ink using pigments has superior water-fastness and lightfastness compared with ink of the related art that uses water-soluble dyes.

However, pigmented inkjet recording ink that excel in fast dryness and suited for recording in paper medium, and that can produce high-quality image on paper medium without causing distortion in paper medium or without clogging in the process of intermittent ejection are not available.

BRIEF DESCRIPTION OF THE DRAWING

The single FIGURE shows an example of an inkjet recording apparatus.

DETAILED DESCRIPTION

In general, according to one embodiment, an inkjet ink includes water, a pigment, a water-soluble organic solvent, a poorly water-soluble compound, a solubilizer that solubilizes the poorly water-soluble compound in water, and an acetylene glycol-based surfactant. The poorly water-soluble compound is 2,5,8,11-tetramethyl-6-dodecyne-5,8-diol. The solubilizer is selected from polyoxyethylene anionic surfactants and non-ionic surfactants.

The following specifically describes embodiments.

In the inkjet recording apparatus in the FIGURE, paper cassettes 100 and 101 each of which holds paper P of different size. A paper feed roller 102 or 103 takes out the paper P in response to the selected paper size from the paper cassette 100 or 101 and conveys it to conveyance roller pairs 104 and 105 and a resist roller pair 106.

A tension is given to a conveyance belt 107 by a drive roller 108 and two driven rollers 109. Holes are provided at predetermined intervals on the surface of the conveyance belt 107, and for the purpose of adsorbing the paper P onto the conveyance belt 107, a negative-pressure chamber 111 connected to a fan 110 is installed in the inside of the conveyance belt 107. Conveyance roller pairs 112, 113, and 114 are installed in the downstream of the paper conveyance direction of the conveyance belt 107.

Four rows of inkjet heads that eject inks on a paper according to image data are disposed above the conveyance belt 107. An inkjet head 115C which ejects a cyan (C) ink, an inkjet head 115M which ejects a magenta (M) ink, an inkjet head 115Y which ejects a yellow (Y) ink, and an inkjet head 115Bk which ejects a black (Bk) ink are arranged in this order from the upstream. Further, these inkjet heads 115C, 115M, 115Y, and 115Bk are provided with a cyan (C) ink cartridge 116C, a magenta (M) ink cartridge 116M, a yellow (Y) ink cartridge 116Y, and a black (Bk) ink cartridge 116Bk, respectively, each of which contains an ink of each color. These cartridges are connected to the inkjet heads via tubes 117C, 117M, 117Y, and 117Bk, respectively.

An image forming operation of the apparatus for inkjet printing having a configuration as described above is described below.

First, image processing for printing by an image processor (not shown) is initiated, and image data for printing are transferred to the respective inkjet heads 115C, 115M, 115Y, and 115Bk. Also, a sheet of the paper P of a selected paper size is taken out one by one from the paper cassette 100 or 101 by the paper feed roller 102 or 103 and conveyed to the conveyance roller pairs 104 and 105 and the resist roller pair 106. The resist roller pair 106 corrects a skew of the paper P and conveys the paper at a predetermined timing.

The negative-pressure chamber 111 draws air through the holes of the conveyance belt 107, and therefore, the paper P is conveyed in a state that it is adsorbed onto the conveyance belt 107 in a lower side of the inkjet heads 115C, 115M, 115Y, and 115Bk. Thus, the respective inkjet heads 115C, 115M, 115Y, and 115Bk and the paper P can keep a fixed space from each other. The ink of each color is ejected from each of the inkjet heads 115C, 115M, 115Y, and 115Bk in synchronism with the timing for conveying the paper P from the resist roller pair 106. Thus, a color image is formed at a desired position on the paper P. The paper P having an image formed thereon is discharged into a paper discharge tray 118 by the conveyance roller pairs 112, 113, and 114.

Each ink cartridge stores an inkjet aqueous ink of an embodiment.

The inkjet aqueous ink according to one embodiment is a mixture of a poorly water-soluble compound and a solubilizer in a pigment-containing aqueous dispersion, the aqueous dispersion containing water, a water-soluble organic solvent, and an acetylene glycol-based surfactant.

The pigment is not particularly limited, and any of an inorganic pigment and an organic pigment may be used. Examples of the inorganic pigment include titanium oxide and iron oxide. Further, a carbon black produced by a method such as a contact method, a furnace method, or a thermal method can be used.

As the organic pigment, for example, an azo pigment (such as an azo lake pigment, an insoluble azo pigment, a condensed azo pigment, or a chelate azo pigment), a polycyclic pigment (such as a phthalocyanine pigment, a perylene pigment, a perinone pigment, an anthraquinone pigment, a quinacridone pigment, a dioxazine pigment, a thioindigo pigment, an isoindolinone pigment, or a quinophthalone pigment), a dye chelate (such as a basic dye type chelate, or an acid dye type chelate), a nitro pigment, a nitroso pigment, Aniline Black or the like can be used.

Specific examples of the carbon black which is used as the black ink include No. 2300, No. 900, MCF88, No. 33, No. 40, No. 45, No. 52, MA7, MA8, MA100, and No. 2200B (all of which are manufactured by Mitsubishi Chemical Corporation), Raven 5750, Raven 5250, Raven 5000, Raven 3500, Raven 1255, and Raven 700 (all of which are manufactured by Columbian Chemicals Company), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all of which are manufactured by Cabot Corporation), and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (all of which are manufactured by Degussa AG).

Specific examples of the pigment which is used in the yellow ink include C.I. Pigment Yellow 1, C.I. Pigment Yellow 2, C.I. Pigment Yellow 3, C.I. Pigment Yellow 12, C.I.

Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185.

Specific examples of the pigment which is used in the magenta ink include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, and C.I. Pigment Violet 19.

Specific examples of the pigment which is used in the cyan ink include C.I. Pigment Blue 1, C.I. Pigment Blue 2, C.I. Pigment Blue 3, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Vat Blue 4, and C.I. Vat Blue 60.

In the inkjet ink, the pigment generally has an average particle diameter of from about 10 to 300 nm. More generally, the pigment has an average particle diameter of from about 10 to 200 nm.

The average particle diameter of the pigment can be measured using a particle diameter analyzer according to a dynamic light scattering method. An example of a particle diameter analyzer is HPPS (Malvern).

The pigment can be used in the state of a pigment dispersion. The pigment dispersion can be prepared by, for example, dispersing the pigment in water with a dispersant. Examples of dispersant include a surfactant or a water-soluble resin. Alternatively, the pigment can be used in the form of a self-dispersing pigment dispersible in water without using a dispersant. The self-dispersing pigment is of a form dispersible in water without a dispersant, and to which at least one functional group selected from a carbonyl group, a carboxyl group, a hydroxyl group, and a sulfone group, or a salt thereof is attached by a surface treatment. The surface treatment may be, for example, a vacuum plasma process, a diazo coupling process, or an oxidation treatment. The self-dispersing pigment can be obtained by grafting the functional group or a functional group-containing molecule to the pigment surface using such surface treatments.

The pigment content in the ink is preferably 3 to 20% by weight of the total ink. Within this range, prints having desired image densities can be produced without causing inconvenience in ink storage stability and ejection performance. The pigment content in the ink is more preferably 4 to 10% by weight.

The water-soluble organic solvent serves as a humectant to prevent drying of the ink. Examples of the water-soluble organic solvent include polyhydric alcohol, nitrogen-containing heterocyclic compounds, amines, and sulfur-containing compounds.

As the polyhydric alcohol, for example, ethylene glycol, diethylene glycol, triethylene glycol, polyethylene glycol, polypropylene glycol, 1,5-pentanediol, 1,6-hexanediol, glycerin, 1,2,6-hexanetriol, 1,2,4-butanetriol, 1,2,3-butanetriol, and 3-methyl-1,3,5-pentanetriol can be used.

As the nitrogen-containing heterocyclic compounds, for example, N-methyl-2-pyrrolidone, N-hydroxyethyl-2-pyrrolidone, 2-pyrrolidone, 1,3-dimethylimidazolidinone, and ε-caprolactam can be used.

As the amines, for example, monoethanolamine, diethanolamine, triethanolamine, monoethylamine, diethylamine, and triethylamine can be used.

As the sulfur-containing compounds, for example, dimethyl sulfoxide, sulfolane, and thiodiethanol can be used.

Further, propylene carbonate, ethylene carbonate, or γ-butyrolactone also can be used as the humectant.

The organic solvents exemplified above also serve to improve dispersion stability of the pigment in the ink. The organic solvent may be used either alone or in combination of two or more.

Glycerin has superior water retention, and does not evaporate as easily as other organic solvents owning to its high boiling point. It is therefore preferable that at least a part of the water-soluble organic solvent is glycerin. Specifically, glycerin preferably accounts for at least 5% by weight of the water-soluble organic solvent.

Sufficient water retention can be ensured without impairing drying of the ink, if the water-soluble organic solvent is contained in an amount of, for example, 30 to 60% by weight of the total ink. The content of the water-soluble organic solvent is preferably 35 to 50% by weight of the total ink.

A solid humectant such as urea, thiourea, and ethylene urea may be used together to impart moistening effect. In this case, the solid humectant is preferably blended in an amount of no more than 50% by weight of the water-soluble organic solvent.

The ink of the one embodiment contains 2,5,8,11-tetramethyl-6-dodecyne-5,8-diol with a specified solubilizer. The 2,5,8,11-tetramethyl-6-dodecyne-5,8-diol is poorly soluble in water. The present inventors used a specified solubilizer to enable the poorly water-soluble compound to dissolve in water.

In the ink containing the poorly water-soluble compound solubilized by the solubilizer, the pigment is stably dispersed, and clogging of the nozzles does not occur even in intermittent ejection from the printer head. The ink also excels in ejection stability owning to the pigment dispersion stability. Further, the ink of the present embodiment excels in fast-dryness, and enables formation of a high-quality image on paper medium.

The present inventors speculate these superior attributes of the ink as follows. Because of the hydrophobicity of the 2,5,8,11-tetramethyl-6-dodecyne-5,8-diol, the wettability of the ink for the inkjet head and the ink channel members is improved, which in turn improves the ejection stability of the ink. Because wettability is improved not only for the printer components but for the printed paper medium, the fast-dryness of the ink is improved.

As used herein, the "paper medium" generally refers to various kinds of paper medium intended for printing. The paper medium can be broadly classified into coated paper and non-coated paper, the former including art paper and coat paper to which materials for improving print characteristics are applied, and the latter representing a class of papers that exploits the characteristics of the paper itself. The paper medium has a variety of applications, such as in books, documents, newspapers, wrapping, and printer papers. The paper medium also includes thick papers such as cardboards, paper containers, and boxboards. For example, so-called plain paper such as copy paper to be used in a copier or a printer for office or home use is a typical paper medium.

Effects can be obtained if the poorly water-soluble compound is contained in an amount of, for example, 0.1 to 5% by weight of the total ink. Preferably, the content of the poorly water-soluble compound is 0.5 to 2% by weight of the total ink.

The solubilizer that solubilizes the poorly water-soluble compound in water is selected from polyoxyethylene anionic surfactants and non-ionic surfactants. The present inventors enabled the 2,5,8,11-tetramethyl-6-dodecyne-5,8-diol to dissolve in water by blending such surfactants.

Examples of polyoxyethylene anionic surfactants include a polyoxyethylene alkylether carboxylate represented by general formula (POE1), a polyoxyethylene alkylether sulfate ester salt represented by general formula (POE2), and a polyoxyethylene alkylether phosphate represented by general formula (POE3) below.

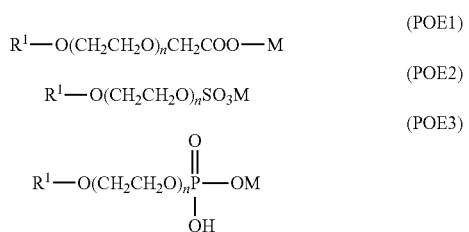

In the general formulae, $R^1$ represents the alkyl group having 12 to 18 carbon atoms, and M represents sodium, potassium, triethanolamine, or ammonia. Further, n is 1 to 10. The alkyl group $R^1$ preferably has 12 to 15 carbon atoms, and n is preferably 3 to 10.

As the non-ionic surfactants, for example, a polyoxyethylene sorbitan monolaurate represented by general formula (POE4) below can be used.

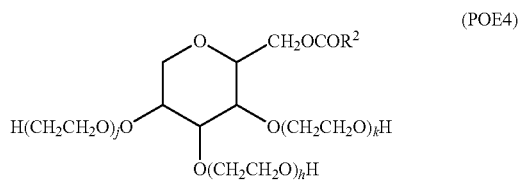

In the general formula, $R^2$ represents the alkyl group having 12 to 18 carbon atoms, and j+h+k is 6 to 20.

The ink can exhibit effects if it contains the solubilizer in an amount of, for example, 0.1 to 5% by weight of the total ink, through it depends on the content of the poorly water-soluble compound. Preferably, the content of the solubilizer is 1 to 3% by weight of the total ink.

The ink of the one embodiment also includes an acetylene glycol-based surfactant, in addition to the foregoing components. The acetylene glycol-based surfactant serves as a surface tension adjuster.

As the acetylene glycol-based surfactant, for example, 2,4,7,9-tetramethyl-5-decyne-4,7-diol, 3,6-dimethyl-4-octyne-3,6-diol, and 3,5-dimethyl-1-hexyne-3-ol of can be used. Specifically, Surfynol 104, 82, 465, 485, or TG (Air Products; US) can be used. The resulting image quality can be further improved with use of Surfynol 465 or 104, or TG.

The ink can exhibit effects if the acetylene glycol-based surfactant is contained in an amount of, for example, about 0.5 to 3% by weight of the total ink.

Another surfactant having a surface tension adjusting effect may be used together, so long as the effect of the acetylene glycol-based surfactant is maintained. Examples of such surfactants include dodecylbenzene sulfonate and lauryl sulfate.

If such additional surfactants were used, it is preferable that the surfactant be blended so that the combined amount with the acetylene glycol-based surfactant is 0.5 to 3% by weight of the total ink.

The ink according to the one embodiment may include 3-methoxy-3-methyl-1-butanol. 3-methoxy-3-methyl-1-butanol promotes absorption of the ink into the paper, and thus increases the drying of the ink. In color printing, mixing of adjacent colors (bleed) can be prevented. 3-methoxy-3-methyl-1-butanol thus serves as a penetrant.

Further, 3-methoxy-3-methyl-1-butanol improves the dispersion stability of the pigment over time. Increase of particle diameter and the ink viscosity is suppressed, and thus ejection stability is improved.

The ink can exhibit the intended effects without any inconvenience if the 3-methoxy-3-methyl-1-butanol is contained in an amount of, for example, 0.5 to 20% by weight of the total ink.

Additives such as a pH adjuster, a preservative, and/or an anti-fungal agent may be blended. As the pH adjuster, for example, polyvinylpyrrolidone, alginic acid, potassium dihydrogen phosphate, disodium hydrogen phosphate, and sodium hydroxide can be used.

Examples of preservative and/or anti-fungal agent include sodium benzoate, sodium pentachlorophenolate, 2-pyridinethiol-1-sodium oxide, sodium sorbate, and sodium dehydroacetate. 1,2-dibenzisothiazolin-3-on, commercially available as, for example, Proxel CRL, Proxel BDN, Proxel GXL, Proxel XL-2, and Proxel TN (ICI), is also effective as a preservative and/or an anti-fungal agent.

The additives serve to further improve print image quality and storage stability.

Because the ink is for inkjet recording, the ink according to the present embodiment needs to have a viscosity suitable for ejection through the head nozzles of inkjet printers. Specifically, a viscosity of the ink preferably at 25° C. is 50 mPa·s or less. The viscosity of inkjet ink at 25° C. is generally 5 mPa·s or more.

The ink according to the one embodiment contains the poorly water-soluble compound 2,5,8,11-tetramethyl-6-dodecyne-5,8-diol, together with a specified solubilizer. The 2,5,8,11-tetramethyl-6-dodecyne-5,8-diol is solubilized in water by the solubilizer. Thus, in the ink according to the present embodiment, the pigment is stably dispersed, and clogging of the nozzles does not occur even in intermittent ejection from the printer head. The ink also excels in ejection stability owning to the dispersion stability of the pigment. Further, the ink of the present embodiment excels in fast-dryness, and can form a high quality image on paper medium.

Specific examples of the ink are described below.

Five pigment dispersions presented in Table 1 below were prepared.

TABLE 1

| Abbreviation | Name |
|---|---|
| D1 | Cabot B |
| D2 | Cabot Y |
| D3 | Cabot M |
| D4 | Cabot C |
| D5 | Fuji Pigment B |

The pigment dispersions D1, D2, D3, and D4 in Table 1 are self-dispersing pigment dispersions available from Cabot Speciality Chemicals Inc. In these dispersions, predetermined pigments are dispersed in water. D5 is a polymer dispersant-dispersed pigment dispersion available from Fuji Pigment Co., Ltd. In this dispersion, a predetermined pigment is dispersed in water with a dispersant.

Six water-soluble organic solvents presented in Table 2 below were prepared.

TABLE 2

| Abbreviation | Compound name |
|---|---|
| W1 | Glycerin |
| W2 | Propylene glycol |
| W3 | Triethylene glycol |
| W4 | Polyethylene glycol #200 |
| W5 | Polyethylene glycol #300 |
| W6 | Polyethylene glycol #1000 |

Five solubilizers were prepared, as listed in Table 3 below with their compound names along with abbreviations.

TABLE 3

| Abbreviation | Compound name |
|---|---|
| S1 | Sodium polyoxyethylene lauryl ether acetate |
| S2 | Sodium polyoxyethylene lauryl ether sulfate |
| S3 | Ammonium polyoxyethylene lauryl ether sulfate |
| S4 | Sodium polyoxyethylene lauryl ether phosphate |
| S5 | Polyoxyethylene sorbitan monolaurate |

Glycol ethers presented in Table 4 below were prepared. Glycol ethers serve as a penetrant.

TABLE 4

| Abbreviation | Compound name |
|---|---|
| E1 | Ethylene glycol monobutyl ether |
| E2 | Diethylene glycol monobutyl ether |

Ink samples were prepared by adding the respective components in ion-exchange water in the formulations shown in Tables 5 and 6 below. For the preparation of the ink samples, the mixture was stirred for 1 hour with a stirrer, and then filtered through a 1-μm membrane filter to give each sample.

The pigments are shown with the type of pigment dispersion used, along with the solid content of the pigment in the ink (% by weight). The amounts of the other components are % by weight of the total ink.

In Table 5, TDD represents 2,5,8,11-tetramethyl-6-dodecyne-5,8-diol, and MMB represents 3-methoxy-3-methyl-1-butanol.

TABLE 5

| No. | Pigment | Aqueous organic solvent liquid | | | | | | | Solubilizer | | | | | |
|---|---|---|---|---|---|---|---|---|---|---|---|---|---|---|
| | | W1 | W2 | W3 | W4 | W5 | W6 | TDD | S1 | S2 | S3 | S4 | S5 | MMB |
| 1 | D1(8) | 30 | | | | | | 0.1 | 0.1 | | | | | |
| 2 | D1(8) | | 60 | | | | | 1 | 1 | | | | | |
| 3 | D1(8) | | | 35 | | | | 5 | | 5 | | | | |
| 4 | D1(8) | 10 | | | 20 | | | 0.5 | | | 0.5 | | | |
| 5 | D5(8) | 20 | 15 | | | | | 3 | | | | | 3 | |
| 6 | D5(8) | 5 | | | 25 | | | 1 | | 3 | | | | |
| 7 | D5(8) | | 25 | | | | 10 | 5 | | | 3 | | | |
| 8 | D2(7) | 45 | | | | 10 | | 5 | | | | 3 | | |
| 9 | D3(7) | 20 | | 40 | | | | 1 | 1 | | | | | |
| 10 | D4(7) | 25 | | | | 15 | | 3 | | | | 3 | | |
| 11 | D1(8) | 30 | | | 10 | | | 0.1 | 3 | | | | | 0.5 |
| 12 | D1(8) | 10 | 25 | | | | 5 | 1 | | 2 | | | | 2 |
| 13 | D1(8) | | 25 | | | 15 | | 5 | | | | 4 | | 5 |
| 14 | D1(8) | 20 | | 20 | | | | 0.5 | 1 | | | | | 10 |
| 15 | D5(8) | 20 | 15 | | | | | 3 | | | 3 | | | 20 |
| 16 | D5(8) | 5 | | | 25 | | | 1 | | 3 | | | | 2 |
| 17 | D5(8) | | 25 | | | | 10 | 5 | | | 3 | | | 5 |
| 18 | D1(7) | 45 | | | | 10 | | 1 | | | 3 | | | 5 |
| 19 | D1(7) | 20 | | 40 | | | | 1 | | 2 | | | | 10 |
| 20 | D1(7) | 25 | | | | 15 | | 3 | | | | 3 | | 20 |

TABLE 6

| No. | Pigment | Water-soluble organic solvent | | | | | | Glycol Ether | |
|---|---|---|---|---|---|---|---|---|---|
| | | W1 | W2 | W3 | W4 | W5 | W6 | E1 | E2 |
| 21 | D1(8) | 30 | | | | | | | |
| 22 | D1(8) | | 60 | | | | | | |
| 23 | D1(8) | | | 35 | | | | | |
| 24 | D1(8) | 10 | | | 20 | | | | |
| 25 | D1(8) | 20 | 15 | | | | | | |
| 26 | D5(8) | 5 | | | 25 | | | | |
| 27 | D5(8) | | 25 | | | | 10 | | |
| 28 | D2(7) | 45 | | | | 10 | | 5 | |
| 29 | D3(7) | 20 | | | 40 | | | 5 | |
| 30 | D4(7) | 25 | | | | 15 | | | 10 |

Though not shown in the tables, all samples Nos. 1 to 30 contained acetylene glycol-based surfactant (Surfynol 465) and preservative (Proxel XL-2(S)). The content of the acetylene glycol-based surfactant is 1% by weight of the total ink, the content of the preservative is 0.2% by weight of the total ink.

The ink samples were evaluated with regard to print quality, fast dryness, anti-clogging property, storage stability, and ejection stability. Evaluations were made as follows.

Print Quality

Text prints were produced using an inkjet recording apparatus equipped with a Toshiba Tec piezoelectric head CBI. Five plain papers—Toshiba copy paper, Xerox 4024 paper, Ricoh high-grade plain paper (Type E), Tidal MP paper, and NEUSIEDLER paper—were used for evaluation.

The printed texts were visually inspected, and print qualities, including feathering and strikethrough, were determined based on the following criteria.
  A: Good print quality in all paper types
  B: Degraded print quality in at most two paper types
  C: Degraded print quality in three or more paper types
  D: Degraded print quality in all paper types Fast Dryness Solid printing was made using each ink sample at 100% duty in a 10 mm×10 mm region of a Toshiba copy paper, using the inkjet recording apparatus. After a predetermined time period, a new plain paper was laminated on the printed portion, and a 300 g weight was placed thereon. After 10 second, the laminated plain paper was separated, and it was conformed whether or not the ink was adhered.

The time until the new plain paper was laminated after the solid printing was set to 5 seconds, 10 seconds, 30 seconds, and 60 seconds. In each of the case, adhesion of the ink was visually examined and evaluated according to the following criteria.

A: No adhesion was observed when the set time was 5 seconds.

B: Adhesion was observed when the set time was 5 seconds and no adhesion was observed when the set time was 10 seconds.

C: Adhesion was observed when the set time was 10 seconds and no adhesion was observed when the set time was 30 seconds.

D: Adhesion was observed when set time was 60 seconds.

Anti-Clogging Property

Prints were made with each ink sample using the inkjet recording apparatus. After the printing, the nozzle holes were capped, and left to stand for 1 week in a 25° C. environment. After this time period, a print test was performed again, and anti-clogging property was evaluated based on ejection stability. Determination was made according to the following criteria based on the number of cleaning operations required to restore the ejection capability.

A: 0
B: 1 or 2
C: 3 to 5

The results were "D" if ejection capability was not restored.

Storage Stability 100 cc of each ink sample was stored in a glass bottle, which was then sealed and stored in a 65° C. thermostat. After 30 days, the surface tension and viscosity of the ink sample were measured, and the presence or absence of precipitation formation was determined. Surface tension was measured with a surface tensiometer CBVP-A3 (Kyowa Interface Science Co., Ltd.). Viscosity was measured with a viscometer TV-33 (Toki Sangyo Co., Ltd.).

Changes in surface tension and viscosity were evaluated based on the percentage increase represented by $100((V_{30}-V_0)/V_0)$, where $V_{30}$ is the value after 30 days, and $V_0$ is the initial value.

Formation of precipitates was visually confirmed, and the results of the observation, along with the percentage increase of the values, were used to evaluate storage stability according to the following criteria.

A: Percentage increase of less than 5%, and no formation of a precipitate

B: Percentage increase of 5% or more and less than 10%, and no formation of a precipitate C: Percentage increase of 10% or more and less than 20%, or formation of a precipitate D: Percentage increase of 20% or more, or formation of a large amount of precipitate Ejection Stability The ink was continuously ejected for 3 hours at ordinary temperature at the resolution of 300 dots/inch, using the inkjet recording apparatus equipped with a Toshiba Tec piezoelectric head. The number of missing dots was checked during the continuous printing, and ejection stability was evaluated according to the following criteria.

A: 5 or less missing dots in 3 hours
B: 6 to 10 missing dots in 3 hours.
C: 10 or more missing dots in 1 hour
D: 10 or more missing dots in 30 minutes The samples need to score "A" for at least two of the five evaluation criteria: print quality, fast dryness, anti-clogging property, storage stability, and ejection stability. Samples fail if the result for any of the criteria is "D". Samples also fail if the results for two or more criteria are "C". The results are summarized in Table 7 below.

TABLE 7

| No. | Print quality | Fast dryness | Anti-clogging property | Storage stability | Ejection stability |
|---|---|---|---|---|---|
| 1 | A | B | A | A | B |
| 2 | B | A | A | A | A |
| 3 | A | A | B | B | B |
| 4 | A | A | A | A | A |
| 5 | A | A | A | A | A |
| 6 | A | A | B | A | A |
| 7 | B | A | B | B | B |
| 8 | B | A | A | B | B |
| 9 | B | A | A | A | A |
| 10 | B | A | A | A | A |
| 11 | A | B | A | A | B |
| 12 | B | A | B | A | A |
| 13 | B | A | A | B | B |
| 14 | B | A | A | A | A |
| 15 | B | A | B | A | A |
| 16 | A | A | B | A | A |
| 17 | A | A | B | B | B |
| 18 | A | A | A | A | A |
| 19 | B | A | A | B | A |
| 20 | B | A | A | B | B |
| 21 | A | C | A | A | C |
| 22 | A | C | A | A | C |
| 23 | A | C | B | B | C |
| 24 | A | C | A | A | C |
| 25 | A | C | A | A | C |
| 26 | A | C | B | B | C |
| 27 | A | C | C | B | C |
| 28 | B | B | A | C | C |
| 29 | B | B | A | C | C |
| 30 | C | A | B | D | D |

As can be seen in Table 7, the results for the ink samples Nos. 1 to 20 are desirable for all of print quality, fast dryness, anti-clogging property, storage stability, and ejection stability. The ink samples Nos. 1 to 20 have these attributes because of the 2,5,8,11-tetramethyl-6-dodecyne-5,8-diol is contained with a predetermined solubilizer.

The ink samples Nos. 21 to 27 have the same compositions as the ink samples Nos. 1 to 7, respectively, except that the 2,5,8,11-tetramethyl-6-dodecyne-5,8-diol and the solubilizer are not contained. The ink samples Nos. 28 to 30 have the same compositions as the ink samples Nos. 8 to 10, respectively, except that glycol ether is contained instead of the combination of the 2,5,8,11-tetramethyl-6-dodecyne-5,8-diol and the solubilizer.

As can be seen in Table 7, ejection stability is inferior in all of the ink samples Nos. 21 to 30. The ink samples Nos. 21 to 30 also have undesirable results for the attributes other than ejection stability, failing the tests for these attributes.

The all attributes—print quality, fast dryness, anti-clogging property, storage stability, and ejection stability—are satisfied by the inclusion of 2,5,8,11-tetramethyl-6-dodecyne-5,8-diol with a predetermined solubilizer.

The inkjet aqueous ink of one embodiment has superior pigment dispersion stability, and clogging of the nozzles does not occur even in intermittent ejection from the printer head. The ink also excels in ejection stability owning to the pigment dispersion stability. Further, the ink of the present embodiment excels in fast-dryness, and enables formation of a high-quality image on paper medium.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inkjet aqueous ink comprising:
    water;
    a pigment;
    a water-soluble organic solvent;
    2,5,8,11-tetramethyl-6-dodecyne-5,8-diol as a poorly water-soluble compound;
    a solubilizer selected from polyoxyethylene anionic surfactants and non-ionic surfactants, and that solubilizes the poorly water-soluble compound in water; and
    an acetylene glycol-based surfactant.

2. The ink according to claim 1, wherein the poorly water-soluble compound accounts for 0.1 to 5% of the total weight of the ink.

3. The ink according to claim 1, wherein the poorly water-soluble compound accounts for 0.5 to 2% of the total weight of the ink.

4. The ink according to claim 1, wherein the solubilizer accounts for 0.1 to 5% of the total weight of the ink.

5. The ink according to claim 1, wherein the solubilizer accounts for 1 to 3% of the total weight of the ink.

6. The ink according to claim 1, wherein the solubilizer is a polyoxyethylene anionic surfactant.

7. The ink according to claim 6, wherein the polyoxyethylene anionic surfactant is selected from the group consisting of polyoxyethylene alkylether carboxylate, a polyoxyethylene alkylether sulfate ester salt, and polyoxyethylene alkylether phosphate.

8. The ink according to claim 1, wherein the solubilizer is a non-ionic surfactant.

9. The ink according to claim 8, wherein the non-ionic surfactant is polyoxyethylene sorbitan monolaurate.

10. The ink according to claim 1, wherein the water-soluble organic solvent accounts for 30 to 60% of the total weight of the ink.

11. The ink according to claim 1, wherein the water-soluble organic solvent accounts for 35 to 50% of the total weight of the ink.

12. The ink according to claim 1, wherein the water-soluble organic solvent is selected from the group consisting of ethylene glycol, diethylene glycol, triethylene glycol, polyethylene glycol, polypropylene glycol, 1,5-pentanediol, 1,6-hexanediol, glycerin, 1,2,6-hexanetriol, 1,2,4-butanetriol, 1,2,3-butanetriol, 3-methyl-1,3,5-pentanetriol, N-methyl-2-pyrrolidone, N-hydroxyethyl-2-pyrrolidone, 2-pyrrolidone, 1,3-dimethylimidazolidinone, ε-caprolactam, monoethanolamine, diethanolamine, triethanolamine, monoethylamine, diethylamine, triethylamine, dimethyl sulfoxide, sulfolane, thiodiethanol, propylene carbonate, ethylene carbonate, and γ-butyrolactone.

13. The ink according to claim 1, wherein at least a part of the water-soluble organic solvent is glycerin.

14. The ink according to claim 1, wherein the acetylene glycol-based surfactant accounts for 0.5 to 3% of the total weight of the ink.

15. The ink according to claim 1, wherein the acetylene glycol-based surfactant is selected from the group consisting of 2,4,7,9-tetramethyl-5-decyne-4,7-diol, 3,6-dimethyl-4-octyne-3,6-diol, and 3,5-dimethyl-1-hexyne-3-ol.

16. The ink according to claim 1, wherein the pigment has an average particle diameter of 10 to 300 nm.

17. The ink according to claim 1, wherein the pigment comprises a functional group or a salt thereof on its surface.

18. The ink according to claim 1, wherein a viscosity of the ink at 25° C. is 50 mPa·s or less.

19. The ink according to claim 1, further comprising 3-methoxy-3-methyl-1-butanol.

20. The ink according to claim 19, wherein the 3-methoxy-3-methyl-1-butanol accounts for 0.5 to 20% of the total weight of the ink.

* * * * *